US012742993B2

(12) United States Patent
Pickard et al.

(10) Patent No.: US 12,742,993 B2
(45) Date of Patent: Sep. 22, 2026

(54) MONOCHROMATIC DISPLAY

(71) Applicant: KORRUS, INC., Los Angeles, CA (US)

(72) Inventors: Paul Kenneth Pickard, Los Angeles, CA (US); Benjamin Harrison, Los Angeles, CA (US)

(73) Assignee: Korrus, Inc., Anaheim, CA (US)

( * ) Notice: Subject to any disclaimer, the term of this patent is extended or adjusted under 35 U.S.C. 154(b) by 231 days.

(21) Appl. No.: 18/776,033

(22) Filed: Jul. 17, 2024

(65) Prior Publication Data

US 2025/0085603 A1 Mar. 13, 2025

Related U.S. Application Data

(60) Provisional application No. 63/527,239, filed on Jul. 17, 2023.

(51) Int. Cl.
*G02F 1/1677* (2019.01)

(52) U.S. Cl.
CPC ................................ *G02F 1/1677* (2019.01)

(58) Field of Classification Search
CPC .............. G02F 1/1336–133628; G02F 1/1677
See application file for complete search history.

(56) References Cited

U.S. PATENT DOCUMENTS 9,410,664 B2 * 8/2016 Krames .................... F21K 9/23

* cited by examiner

*Primary Examiner* — Jason M Han
(74) *Attorney, Agent, or Firm* — FisherBroyles LLP

(57) ABSTRACT

A display comprising (a) a front lit or back lit display; (b) a light source for lighting the display, the light source comprising a violet emitter for emitting violet light having a peak wavelength of 400 to 430 nm and phosphor emitter excited by the violet light and emitting yellow-green light having a peak wavelength of 530 to 620 nm; (c) wherein a combination of the violet light and the yellow green light produces white light; (d) wherein the white light has a color rendering index less than 70.

16 Claims, 2 Drawing Sheets

MONOCHROMATIC DISPLAY

REFERENCE TO RELATED APPLICATIONS

This application is based upon U.S. Provisional Application No. 63/527,239, filed, Jul. 17, 2023, and incorporated herein by reference in its entirety.

FIELD OF INVENTION

The present disclosure relates generally to a display, and, more particularly, to a monochromatic display.

BACKGROUND

The use of violet-pumped LEDs to create night-safe, circadian friendly light sources is known, with applications both in high quality illumination as well as backlighting for computer monitors, displays, televisions, cell phones, laptops, and tablets. However, these applications have requirements for complete color representation, or, in other words, light with a high color rendering index (CRI). A good implementation of this technology requires for greens and reds to be well represented (either in a manner that preserves color fidelity for illumination applications, or gamut for display applications) with violet filling in for the typical blue content to prevent these light sources from causing a melatonin suppression response in users/viewers during the night.

Applicant recognizes that monochromatic displays need not have high CRI, and identifies the need instead for such displays that have low circadian stimulation. The present invention fulfills his need among others.

SUMMARY OF INVENTION

The following presents a simplified summary of the invention in order to provide a basic understanding of some aspects of the invention. This summary is not an extensive overview of the invention. It is not intended to identify key/critical elements of the invention of to delineate the scope of the invention. Its sole purpose is to present some concepts of the invention in a simplified form as a prelude to the more detailed description that is presented later.

Applicant recognizes that for E-Ink displays (and other black and white displays front/monochromatic displays) it is unnecessary to adequately render colors including red to create an effective neutral to warm white backlight with low enough blue content to preserve melatonin production in humans at night. Because black and white displays (either backlit or frontlit) have no colors to represent, simply creating a combination of wavelengths that lands the target color on the black body curve (or in a backlight application, one that allows for the filtered light to land on the black body curve) is adequate. Not only does the simpler system (e.g., violet pump plus yellow-green phosphor) achieve the desired outcome with a monochromatic display, but also the simpler system has advantages over a traditional violet-pumped LED system intended for greater color rendering.

These advantages include for example:

1) Lower cost. The omission of the red phosphor, which is the most expensive phosphor in the creation of a phosphor-converted white LED, reduces materials cost to manufacture the LED.
2) Simpler manufacturing process. In a two or three phosphor system for white LED creation, there is a complex interaction of phosphors requiring tight control by weight in the phosphor mix applied to the LED chip. With a single phosphor system, the complexity of the manufacturing process is reduced.
3) Higher efficacy. In two (or three) phosphor systems used to create white LEDs, a "double conversion" process (self-absorption due to overlap of excitation and emission bands) takes place that reduces efficacy. This is especially true with neutral (3500K or 4000K) and warm white (3000K, 2700K or warmer) LEDs because of the greater use of red phosphor. In this case, when considering a multiphosphor construction, the chip creates violet photons which are absorbed by both green and red phosphors, with the combination producing a white output. However, the red phosphor also absorbs green photons created by the green phosphor—an undesirable but inevitable outcome of multiphosphor construction. A sizable fraction of the energy imparted by the absorbed photon is converted into heat rather than a new, different wavelength photon. So having a portion of the green photons absorbed by the red phosphor incurs phosphor losses twice (violet to green, then green to red) lowering the overall efficacy of the LED device. The ability to create a violet-pumped, white LED system without a red phosphor would then eliminate this loss mechanism and improve efficacy.

Accordingly, one aspect of the invention is a monochromatic display. In one embodiment, the display comprises (a) a front lit or back lit display: (b) a light source for lighting the display, the light source comprising a violet emitter for emitting violet light having a peak wavelength of 400 to 430 nm and phosphor emitter excited by the violet light and emitting yellow-green light having a peak wavelength of 530 to 620 nm, (c) wherein a combination of the violet light and the yellow green light produces white light; (d) wherein the white light has a color rendering index less than 70.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Figure 1:
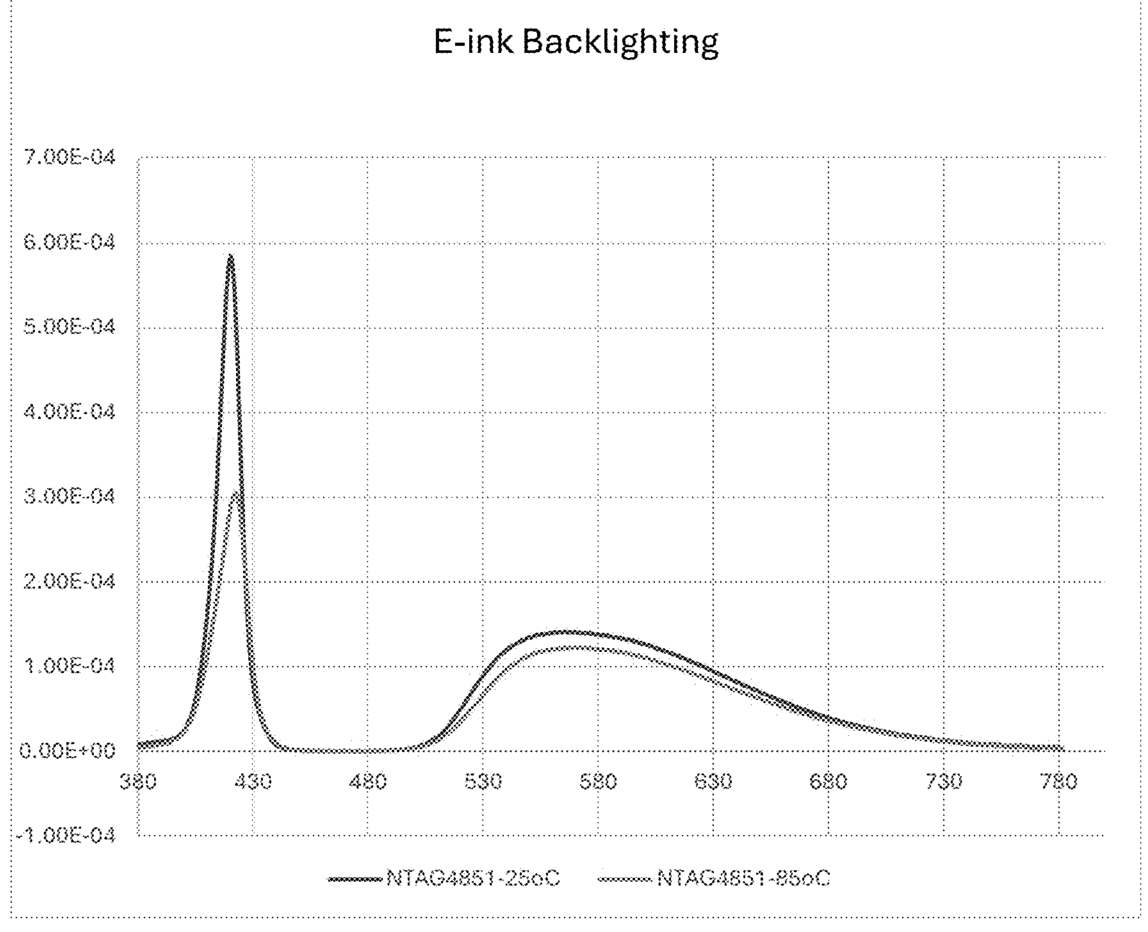
FIG. 1 shows the spectrum of one embodiment of the present invention for warm light at room temperature (25C) and 85C.
Figures 2A, 2B:
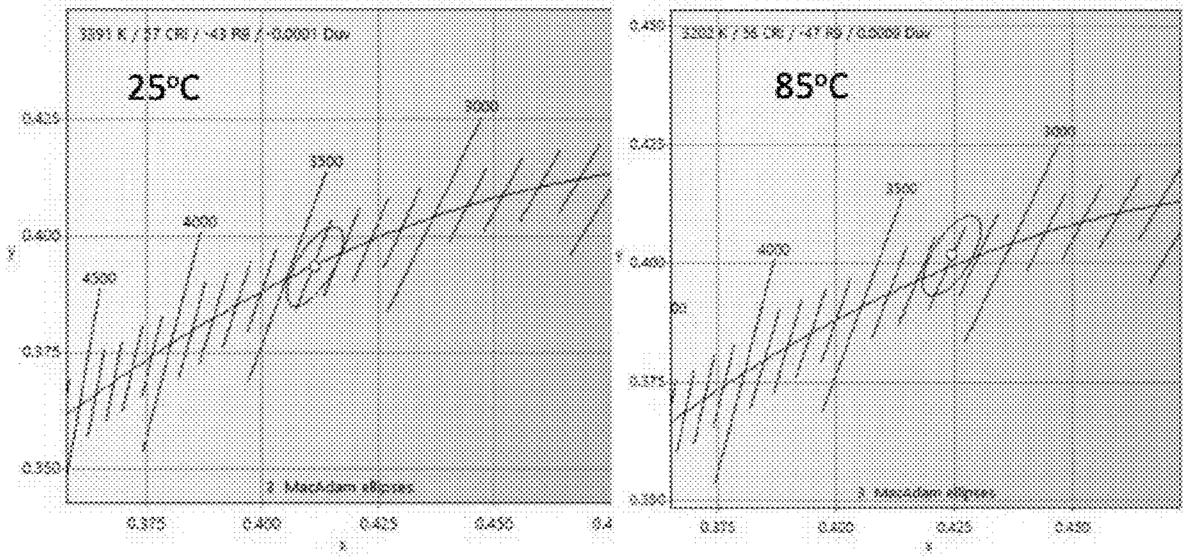
FIGS. 2A and 2B shows color points relative to CCT targets at room temperature and 85 C, respectively.

Referring to FIGS. 1 and 2 and the tables below, one embodiment of this invention is shown. One skilled in the art will recognize that while a specific phosphor (NTAG 4851) and chip wavelength (420-422.5 nm violet) are referenced, different phosphors with similar (longer or shorter peak wavelengths) and different chip wavelengths (anything from 400-425 nm) can may achieve similar results with differences in total % blue content (shorter wavelength chips reduce the % blue), white point (CCT may be cooler or warmer than the example shown) and total efficacy (different phosphors may have wider or narrower full width half maximum wavelength outputs and may be more or less efficient at absorbing violet light.)

Even using a relatively low-efficiency phosphor (NYAG is 10-15% more efficient and preferred over NTAG) the single phosphor implementation achieves 58+ lumens per watt at 85 C.

In one embodiment, the white light has a photomeric/lm (P/l) greater than 20. In one embodiment, the P/l is greater than at 85 C and greater than 24 at 25 C.

In one embodiment, the light source comprises no red emitter for emitting red light having a peak wavelength greater than 620 nm.

TABLE 1

Performance data at room temperature and 85 C.

| Temperature | Current/ mA | Voltage/ V | Radiometric/ W | Photometric/ 1 m | x | y | CCT/ K | CRI | R09 |
|---|---|---|---|---|---|---|---|---|---|
| 25° C. | 20.00 | 5.68 | 0.0269 | 7.52 | 0.4114 | 0.3934 | 3391 | 56.6 | −42.27 |
| 85° C. | 20.00 | 5.53 | 0.0215 | 6.365 | 0.4244 | 0.4016 | 3202 | 55.9 | −47.27 |

TABLE 2

Performance data for 10 samples at room temperature and 85 C.

| Number | Current-Currentsource/ mA | Voltage-Currentsource/ V | Radiometric/ W | Photometric/ 1 m | x-Color Coordinates | y-Color Coordinates | CCT/ K | CRI | CRI09-CRI |
|---|---|---|---|---|---|---|---|---|---|
| 25° C. | | | | | | | | | |
| 1 | 49.98959 | 5.961471 | 0.0926 | 25.7800 | 0.41289 | 0.39585 | 3381 | 57 | −41.1 |
| 2 | 50.00202 | 5.960369 | 0.0934 | 25.2200 | 0.41397 | 0.39426 | 3346 | 56.5 | −42.8 |
| 3 | 49.99272 | 5.951796 | 0.0938 | 24.6100 | 0.40678 | 0.38674 | 3435 | 57.1 | −39.1 |
| 4 | 50.00617 | 5.985836 | 0.0939 | 25.4800 | 0.41119 | 0.39431 | 3389 | 56.9 | −41.4 |
| 5 | 49.99656 | 5.949706 | 0.0947 | 25.6100 | 0.40907 | 0.38971 | 3410 | 56.9 | −41.5 |
| 6 | 50.00333 | 5.984931 | 0.0973 | 25.7600 | 0.40600 | 0.38676 | 3452 | 57.2 | −39.8 |
| 7 | 50.00353 | 5.918047 | 0.0928 | 25.3100 | 0.41091 | 0.39189 | 3389 | 56.8 | −41.2 |
| 8 | 49.99060 | 5.984315 | 0.0949 | 24.6600 | 0.40769 | 0.38817 | 3427 | 57 | −39.2 |
| 9 | 50.00707 | 5.929811 | 0.0911 | 25.2200 | 0.41321 | 0.39637 | 3379 | 56.9 | −41.4 |
| 10 | 49.9901 | 5.931955 | 0.0923 | 25.5300 | 0.41252 | 0.39528 | 3384 | 56.9 | −41.5 |
| 11 | 50.00131 | 5.924171 | 0.0933 | 24.9500 | 0.4103 | 0.39199 | 3403 | 56.9 | −41.6 |
| 85° C. | | | | | | | | | |
| 12 | 50.00465 | 5.775451 | 0.0733 | 21.4600 | 0.42485 | 0.40422 | 3215 | 56.2 | −47.2 |
| 13 | 50.00172 | 5.778173 | 0.0749 | 21.3400 | 0.42509 | 0.39986 | 3175 | 56 | −45.5 |
| 14 | 49.98434 | 5.769985 | 0.0741 | 20.7300 | 0.41874 | 0.39568 | 3262 | 56.4 | −45.1 |
| 15 | 50.00294 | 5.805878 | 0.0749 | 21.5200 | 0.42391 | 0.40293 | 3222 | 56.1 | −47.5 |
| 16 | 50.00767 | 5.774502 | 0.0762 | 21.7300 | 0.42023 | 0.39708 | 3244 | 56.4 | −44.6 |
| 17 | 49.98866 | 6.342897 | 0.0776 | 21.9000 | 0.41976 | 0.39607 | 3280 | 56.7 | −42.8 |
| 18 | 49.9825 | 5.760499 | 0.0745 | 21.3800 | 0.42200 | 0.39885 | 3225 | 56.3 | −44.1 |
| 19 | 49.9906 | 5.806716 | 0.0770 | 21.3700 | 0.41956 | 0.39681 | 3255 | 56.3 | −45.1 |
| 20 | 49.99819 | 5.787511 | 0.0737 | 21.4900 | 0.42483 | 0.40444 | 3218 | 56.1 | −47.5 |
| 21 | 49.98495 | 5.782137 | 0.0739 | 21.5300 | 0.42419 | 0.40339 | 3221 | 56.1 | −47.6 |
| 22 | 49.9914 | 5.769704 | 0.0756 | 21.4800 | 0.42218 | 0.4005 | 3235 | 56.3 | −44.8 |

In one embodiment, the present invention relates to a monochromatic display comprising: (a) a front lit or back lit display; (b) a light source for lighting the display, the light source comprising a violet emitter for emitting violet light having a peak wavelength of 400 to 430 nm and phosphor emitter excited by the violet light and emitting yellow-green light having a peak wavelength of 530 to 620 nm; (c) wherein a combination of the violet light and the yellow green light produces white light; (d) wherein the white light has a color rendering index less than 70.

In one embodiment, the CRI is less than 60.

In one embodiment, the white light has a correlated color temperature (CCT) of 3000-3500K. In one embodiment, the white light does not change CCT by more than 10% between 25 C and 85 C.

In one embodiment, the white light has a radiomatric/W (R/W) greater than 0.06. In one embodiment, the R/W is greater than 0.07 at 85 C and greater than 0.09 at 25 C.

In one embodiment, the phosphor is the only phosphor excited by the violet light. In one embodiment, the phosphor is the only phosphor in the light source. In one embodiment, the phosphor is NTAG 4851.

In one embodiment, the white light corresponds to at least one of a plurality of points along a predefined path near the black body locus in the 1931 CIE Chromaticity Diagram within a 7-step MacAdam ellipse around any point on the black body locus having a correlated color temperature between about 1800K and about 3200K. In one embodiment, the white light is defined by a polygonal region on the 1931 CIE Chromaticity Diagram defined by the following ccx, ccy color coordinates: (0.4006, 0.4044), (0.3736, 0.3874), (0.3670, 0.3578), (0.3898, 0.3716). In one embodiment, the white light is within a single 5-step MacAdam ellipse with center point (0.3818, 0.3797) with a major axis "a" of 0.01565, minor axis "b" of 0.00670, with an ellipse rotation angle Q of 52.70° relative to a line of constant ccy values.

In one embodiment, the violet light has a peak wavelength of 410-425 nm or 420-423 nm.

In one embodiment, the yellow-green light has a peak wavelength of 540 and 600 nm or 555 and 580 nm.

These and other advantages maybe realized in accordance with the specific embodiments described as well as other variations. It is to be understood that the above description is intended to be illustrative, and not restrictive. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

What is claimed is:

1. A monochromatic display, comprising:
- a front lit or back lit display;
- a light source for lighting said display, said light source comprising a violet emitter for emitting violet light having a peak wavelength of 400 to 430 nm and phosphor emitter excited by said violet light and emitting yellow-green light having a peak wavelength of 530 to 620 nm;
- wherein a combination of said violet light and said yellow green light produces white light;
- wherein said white light has a color rendering index less than 70.

2. The monochromatic display of claim 1, wherein said CIR is less than 60.

3. The monochromatic display of claim 1, wherein said white light has a correlated color temperature (CCT) of 3000-3500K.

4. The monochromatic display of claim 3, wherein said white light does not change CCT by more than 10% between 25 C and 85 C.

5. The monochromatic display of claim 1, wherein said white light has a radiomatric/W (R/W) greater than 0.06.

6. The monochromatic display of claim 5, wherein said R/W is greater than 0.07 at 85 C and greater than 0.09 at 25 C.

7. The monochromatic display of claim 1, wherein said white light has a photomeric/lm (P/l) greater than 20.

8. The monochromatic display of claim 7, wherein said P/l is greater than 20 at 85 C and greater than 24 at 25 C.

9. The monochromatic display of claim 1, wherein said light source comprises no red emitter for emitting red light having a peak wavelength greater than 620 nm.

10. The monochromatic display of claim 1, wherein said phosphor is the only phosphor excited by said violet light.

11. The monochromatic display of claim 10, wherein said phosphor is the only phosphor in said light source.

12. The monochromatic display of claim 1, wherein said white light corresponds to at least one of a plurality of points along a predefined path near the black body locus in the 1931 CIE Chromaticity Diagram within a 7-step MacAdam ellipse around any point on the black body focus having a correlated color temperature between about 1800K and about 3200K.

13. The monochromatic display of claim 1, wherein said white light is defined by a polygonal region on the 1931 CIE Chromaticity Diagram defined by the following ccx, ccy color coordinates: (0.4006, 0.4044), (0.3736, 0.3874), (0.3670, 0.3578), (0.3898, 0.3716).

14. The monochromatic display of claim 1, wherein said white light is within a single 5-step MacAdam ellipse with center point (0.3818, 0.3797) with a major axis "a" of 0.01565, minor axis "b" of 0.00670, with an ellipse rotation angle Q of 52.70° relative to a line of constant ccy values.

15. The monochromatic display of claim 1, wherein said violet light has a peak wavelength of 410-425 nm or 420-423 nm.

16. The monochromatic display of claim 1, wherein said yellow-green light has a peak wavelength of 540 and 600 nm or 555 and 580 nm.

* * * * *